United States Patent
Hormann et al.

(10) Patent No.: US 9,927,800 B2
(45) Date of Patent: *Mar. 27, 2018

(54) MANUFACTURING SYSTEM WITH INTERCHANGEABLE TOOLING HEADS AND TOOLING NESTS

(71) Applicant: Clover Technologies Group, LLC, Ottawa, IL (US)

(72) Inventors: Heymo Hormann, Wilmington, IL (US); Robert Carducci, Ottawa, IL (US); Rene Paul Beauchamp, Tinley Park, IL (US)

(73) Assignee: Clover Technologies Group, LLC, Ottawa, IL (US)

( * ) Notice: Subject to any disclaimer, the term of this patent is extended or adjusted under 35 U.S.C. 154(b) by 334 days.

This patent is subject to a terminal disclaimer.

(21) Appl. No.: 14/957,726

(22) Filed: Dec. 3, 2015

(65) Prior Publication Data

US 2016/0085234 A1    Mar. 24, 2016

Related U.S. Application Data

(63) Continuation of application No. 13/630,268, filed on Sep. 28, 2012, now Pat. No. 9,207,657.

(51) Int. Cl.
  *G05B 15/02*  (2006.01)
  *B23Q 37/00*  (2006.01)
  *B25J 9/16*  (2006.01)
  *G05B 19/409*  (2006.01)

(52) U.S. Cl.
  CPC ........... *G05B 19/409* (2013.01); *B23Q 37/00* (2013.01); *B25J 9/16* (2013.01); *G05B 15/02* (2013.01); *G05B 2219/45094* (2013.01); *G05B 2219/50291* (2013.01)

(58) Field of Classification Search
  None
  See application file for complete search history.

(56) References Cited

U.S. PATENT DOCUMENTS

| | | | |
|---|---|---|---|
| 4,488,241 A | 12/1984 | Hutchins et al. |
| 4,549,846 A | 10/1985 | Torii et al. |
| 4,604,787 A | 8/1986 | Sievers, Jr. |
| 4,613,277 A | 9/1986 | Guay |

(Continued)

FOREIGN PATENT DOCUMENTS

DE        3731471 A    4/1989

*Primary Examiner* — Khaja Ahmad
(74) *Attorney, Agent, or Firm* — Mathew G. Gavronski

(57) ABSTRACT

A manufacturing center configured for use with a plurality of tools and a plurality of nests. The manufacturing center includes a base configured for coupling with one of the plurality of nests. The base includes a base electrical connector. The manufacturing center also includes an arm configured for coupling with one of the plurality of tools. The arm has an end movable with respect to the base, and the end includes an arm electrical connector. A controller is operable to control movement of the arm and is in communication with the base electrical connector and the arm electrical connector. The controller is operable to identify which one of the plurality of tools is coupled with the arm and which one of the plurality of nests is coupled with the base at least in part by way of communication with the arm electrical connector and the base electrical connector.

20 Claims, 15 Drawing Sheets

(56) References Cited

U.S. PATENT DOCUMENTS

| | | | |
|---|---|---|---|
| 4,620,362 | A | 11/1986 | Reynolds |
| 4,621,854 | A | 11/1986 | Boley et al. |
| 4,652,203 | A | 3/1987 | Nakashima et al. |
| 4,660,274 | A | 4/1987 | Goumas et al. |
| 4,674,946 | A | 6/1987 | Crawford |
| 4,676,142 | A | 6/1987 | Mccormick et al. |
| 4,784,421 | A | 11/1988 | Alvite |
| RE32,854 | E | 2/1989 | McCormick et al. |
| 4,830,569 | A | 5/1989 | Jannborg |
| 4,897,014 | A | 1/1990 | Tietze |
| 4,913,617 | A | 4/1990 | Nicholson |
| 6,398,279 | B1 | 6/2002 | Kikut |
| 6,530,616 | B1 | 3/2003 | Mcintosh et al. |
| 6,786,896 | B1 | 9/2004 | Madhani et al. |
| 7,204,792 | B2 | 4/2007 | Hagihara et al. |
| 8,105,320 | B2 | 1/2012 | Manzo |
| 2008/0079456 | A1* | 4/2008 | Lee .................... G01R 31/2893 324/750.03 |
| 2008/0119339 | A1 | 5/2008 | Oliver |
| 2009/0024241 | A1* | 1/2009 | Rice ................. G05B 19/41875 700/112 |
| 2009/0139375 | A1 | 6/2009 | Hathaway et al. |
| 2010/0314895 | A1 | 12/2010 | Rizk et al. |
| 2012/0073154 | A1* | 3/2012 | Matsumiya ............ G01B 5/008 33/503 |

* cited by examiner

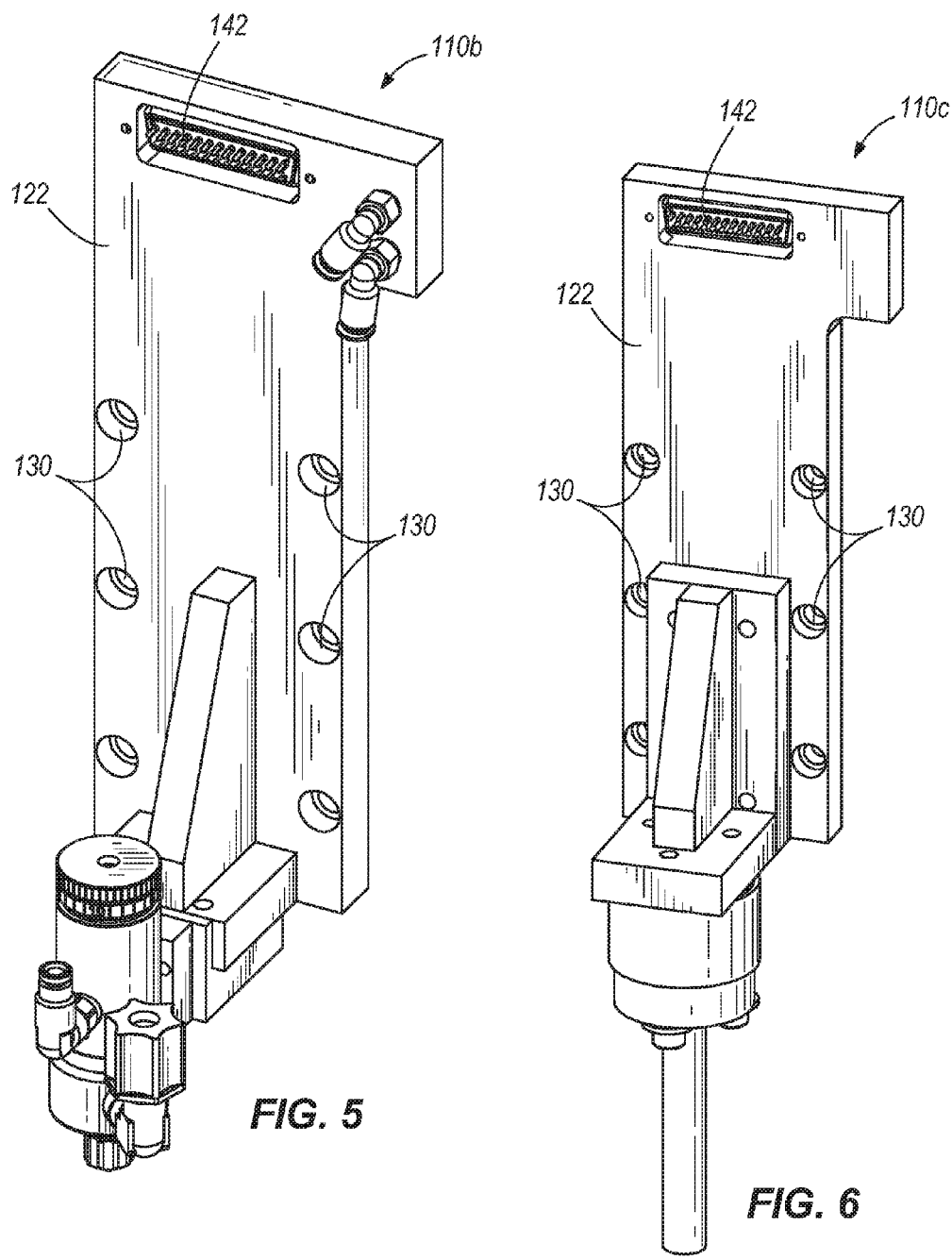

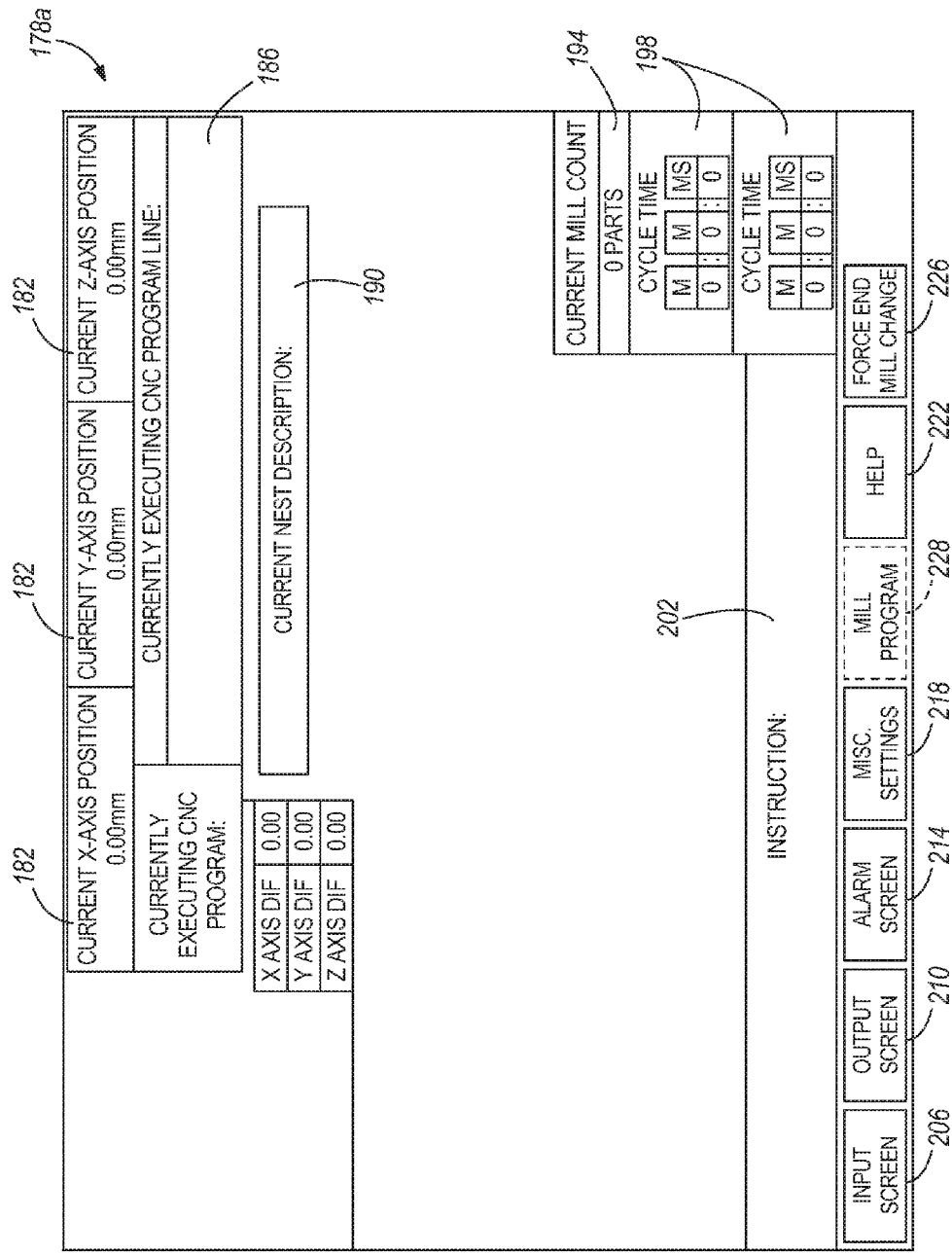

| | INPUT STATUS SCREEN | |
|---|---|---|
| FALSE | I100 SPINDLE MOTOR TEMP. SENSOR | FALSE I121 Y AXIS POSITIVE LIMIT |
| TRUE | I101 LIGHT CURTAIN 1 | FALSE I122 Y AXIS NEGATIVE LIMIT |
| TRUE | I102 AIR PRESSURE CONFIRM | FALSE I123 Z AXIS POSITIVE LIMIT |
| FALSE | I103 NOT USED | FALSE I124 Z AXIS NEGATIVE LIMIT |
| TRUE | I104 LIGHT CURTAIN 2 | FALSE I125 NEST SWITCH INPUT 1 |
| FALSE | I105 SPINDLE AT SPEED | FALSE I126 NEST SWITCH INPUT 2 |
| FALSE | I106 NOT USED | FALSE I127 NEST SWITCH INPUT 3 |
| FALSE | I107 NOT USED | FALSE I128 NEST SWITCH INPUT 4 |
| FALSE | I108 X SERVO DRIVE ALARM | FALSE I129 NEST SWITCH INPUT 5 |
| FALSE | I109 Y SERVO DRIVE ALARM | FALSE I130 NEST SWITCH INPUT 6 |
| FALSE | I110 Z SERVO DRIVE ALARM | FALSE I131 NEST ID INPUT 0 |
| FALSE | I111 X SERVO READY | FALSE I132 NEST ID INPUT 1 |
| FALSE | I112 Y SERVO READY | TRUE I133 NEST ID INPUT 2 |
| FALSE | I113 Z SERVO READY | FALSE I134 NEST ID INPUT 3 |
| TRUE | I114 E STOP | TRUE I135 NEST ID INPUT 4 |
| FALSE | I115 SPINDLE DRIVE FAULT | FALSE I136 DOOR CLOSED |
| FALSE | I116 X AXIS HOME PROX | TRUE I137 DOOR LOCKED |
| FALSE | I117 Y AXIS HOME PROX | FALSE I138 OPTO TOUCH |
| FALSE | I118 Z AXIS HOME PROX | FALSE I139 NOT USED |
| FALSE | I119 X AXIS POSITIVE LIMIT | |
| FALSE | I120 X AXIS NEGATIVE LIMIT | |

| MAIN SCREEN | VIEW OUTPUTS |
|---|---|

*FIG. 10*

OUTPUT STATUS SCREEN

| | | | | |
|---|---|---|---|---|
| FALSE | O100 YELLOW LIGHT | | FALSE | O121 Z AXIS BRAKE |
| FALSE | O101 NEST VALVE 1 | | FALSE | O122 NOT USED |
| FALSE | O102 NEST VALVE 2 | | FALSE | O123 NOT USED |
| FALSE | O103 NEST VALVE 3 | | FALSE | O124 LOCK DOOR |
| FALSE | O104 CABINET COOLING VALVE | | FALSE | O125 NOT USED |
| FALSE | O105 GREEN LIGHT | | FALSE | O126 NOT USED |
| FALSE | O106 CYCLE COUNTER | | FALSE | O127 NOT USED |
| FALSE | O107 RED LIGHT | | FALSE | O128 NOT USED |
| FALSE | O108 X SERVO ENABLE | | FALSE | O129 NOT USED |
| FALSE | O109 Y SERVO ENABLE | | FALSE | O130 NOT USED |
| FALSE | O110 Z SERVO ENABLE | | FALSE | O131 NOT USED |
| FALSE | O111 X AXIS SERVO ON | | | |
| FALSE | O112 Y AXIS SERVO ON | | | |
| FALSE | O113 Z AXIS SERVO ON | | | |
| FALSE | O114 X AXIS RESET | | | |
| FALSE | O115 Y AXIS RESET | | | |
| FALSE | O116 Z AXIS RESET | | | |
| FALSE | O117 START SPINDLE | | | |
| FALSE | O118 AIR ON | | | |
| FALSE | O119 SERVO POWER CONTACTOR | | | |
| FALSE | O120 SPINDLE POWER CONTACTOR | | | |

| MAIN SCREEN | VIEW INPUTS |
|---|---|

FIG. 11

HELP PAGES

ALARM DESCRIPTIONS –

| DOOR OPEN | |
|---|---|
| THESE ALARMS ARE GENERATED WHEN INPUT 136 OF THE PLC IS TRUE. THESE INPUTS TURN FALSE WHEN ALL THREE GUARDING DOORS ARE CLOSED. | CURRENT STATUS: INPUT 136: FALSE |

| DOOR NOT LOCKED FAULT | |
|---|---|
| AFTER STARTING THE MACHINE ALL MAINTENANCE DOORS WILL BE LOCKED VIA THE DOOR LOCK OUTPUTS. (OUTPUT 124 TRUE). AFTER THE LOCKING OF THE DOORS, THE LOCK CONFIRM INPUTS SHOULD BE ON ((INPUT 137 TRUE). IF THIS IS NOT THE CASE, THE "DOOR NOT LOCKED ALARM" IS GENERATED. | CURRENT STATUS: INPUT 137: TRUE  OUTPUT 124: FALSE |

| MAIN AIR PRESSURE LOW | |
|---|---|
| THIS ALARM IS GENERATED WHEN INPUT 102 OF THE PLC ARE FALSE AT ANY POINT THE MACHINE IS RUNNING. THIS CAN HAPPEN DUE TO INSUFFICIANT AIR SUPPLY. IF OUTPUT 118 IS TRUE AND INPUT 102 IS FALSE, THEN THE AIR SUPPLY TO THE MACHINE IS INTERRUPTED. IF OUTPUT 134 IS TRUE AND INPUT 103 IS FALSE, THEN THE AIR SUPPLY TO THE MACHINE IS INTERRUPTED. | CURRENT STATUS: INPUT 137: TRUE  OUTPUT 124: FALSE |

| I125 NEST CYLINDER SWITCH FAULT | SWITCH FAULT SEE ALARM SCREEN |
|---|---|
| THESE ALARMS ARE GENERATED WHEN INPUT 125 IS FALSE WHILE OUTPUT 101 IS TRUE. THESE ALARMS ARE ALSO GENERATED WHEN INPUT 125 IS TRUE WHILE OUTPUT 101 IS FALSE. THIS TYPICALLY OCCURS WHEN DEBRIS IS BLOCKING A CYLINDER OR A SWITCH IS FAULTY. | CURRENT STATUS: INPUT 137: FALSE  OUTPUT 124: FALSE |

| I126 NEST CYLINDER SWITCH FAULT | SWITCH FAULT SEE ALARM SCREEN |
|---|---|
| THESE ALARMS ARE GENERATED WHEN INPUT 126 IS FALSE WHILE OUTPUT 101 IS FALSE. THESE ALARMS ARE ALSO GENERATED WHEN INPUT 125 IS TRUE WHILE OUTPUT 101 IS TRUE. THIS TYPICALLY OCCURS WHEN DEBRIS IS BLOCKING A CYLINDER OR A SWITCH IS FAULTY. | CURRENT STATUS: INPUT 137: FALSE  OUTPUT 124: FALSE |

| I127 NEST CYLINDER SWITCH FAULT | SWITCH FAULT SEE ALARM SCREEN |
|---|---|
| THESE ALARMS ARE GENERATED WHEN INPUT 127 IS FALSE WHILE OUTPUT 102 IS TRUE. THESE ALARMS ARE ALSO GENERATED WHEN INPUT 127 IS TRUE WHILE OUTPUT 102 IS FALSE. THIS TYPICALLY OCCURS WHEN DEBRIS IS BLOCKING A CYLINDER OR A SWITCH IS FAULTY. | CURRENT STATUS: INPUT 137: FALSE  OUTPUT 124: FALSE |

| MAIN SCREEN | NEXT | PREVIOUS | | MAINTENANCE |

FIG. 12

MILL PROGRAM SCREEN 1

| X-AXIS 0.00MM | X-AXIS 0.00MM | STANDARD PROGRAM | | | | | |
|---|---|---|---|---|---|---|---|
| LINE | MOTION TYPE | X-AXIS POSITION | Y-AXIS POSITION | Z-AXIS POSITION | SPEED | RADIUS | | |
| 01 | 00 | X-AXIS 0.00MM | Y-AXIS 0.00MM | Z-AXIS 0.00MM | | | TEACH | GO TO POS 1 |
| 02 | 00 | X-AXIS 0.00MM | Y-AXIS 0.00MM | Z-AXIS 0.00MM | | | TEACH | GO TO POS 2 |
| 03 | 00 | X-AXIS 0.00MM | Y-AXIS 0.00MM | Z-AXIS 0.00MM | | | TEACH | GO TO POS 3 |
| 04 | 00 | X-AXIS 0.00MM | Y-AXIS 0.00MM | Z-AXIS 0.00MM | | | TEACH | GO TO POS 4 |
| 05 | 00 | X-AXIS 0.00MM | Y-AXIS 0.00MM | Z-AXIS 0.00MM | | | TEACH | GO TO POS 5 |
| 06 | 00 | X-AXIS 0.00MM | Y-AXIS 0.00MM | Z-AXIS 0.00MM | | | TEACH | GO TO POS 6 |
| 07 | 00 | X-AXIS 0.00MM | Y-AXIS 0.00MM | Z-AXIS 0.00MM | | | TEACH | GO TO POS 7 |
| 08 | 00 | X-AXIS 0.00MM | Y-AXIS 0.00MM | Z-AXIS 0.00MM | | | TEACH | GO TO POS 8 |
| 09 | 00 | X-AXIS 0.00MM | Y-AXIS 0.00MM | Z-AXIS 0.00MM | | | TEACH | GO TO POS 9 |
| 10 | 00 | X-AXIS 0.00MM | Y-AXIS 0.00MM | Z-AXIS 0.00MM | | | TEACH | GO TO POS 10 |
| 11 | 00 | X-AXIS 0.00MM | Y-AXIS 0.00MM | Z-AXIS 0.00MM | | | TEACH | GO TO POS 11 |
| 12 | 00 | X-AXIS 0.00MM | Y-AXIS 0.00MM | Z-AXIS 0.00MM | | | TEACH | GO TO POS 12 |
| 13 | 00 | X-AXIS 0.00MM | Y-AXIS 0.00MM | Z-AXIS 0.00MM | | | TEACH | GO TO POS 13 |
| 14 | 00 | X-AXIS 0.00MM | Y-AXIS 0.00MM | Z-AXIS 0.00MM | | | TEACH | GO TO POS 14 |
| CANCEL | PROGRAM NAMES | SAVE | NEXT | BACKUP PROGRAM | TOOLBOX | CALCULATOR | MOVE AXIS POPUP | PROGRAM HELP |

FIG. 14

MANUFACTURING SYSTEM WITH INTERCHANGEABLE TOOLING HEADS AND TOOLING NESTS

CROSS-REFERENCE TO RELATED APPLICATION

This is a continuation of U.S. patent application Ser. No. 13/630,268, filed Sep. 28, 2012 and issued as U.S. Pat. No. 9,207,657 on Dec. 8, 2015, the entire contents of which are hereby incorporated by reference herein.

TECHNICAL FIELD

This invention relates generally to a computer controlled manufacturing system and, more particularly, to a computer controlled manufacturing system with interchangeable tooling heads and tooling nests.

BACKGROUND

Computer controlled manufacturing and machining centers are known for conducting a variety of operations on various articles of manufacture. Such manufacturing and machining centers generally include a system of drives, controls, and motors operable to move a tool head along or about one or more axes of operation. Examples of manufacturing operations that can be accomplished by such manufacturing and machining centers include drilling, milling, routering, glue application, screw driving, heat staking, and the like. Each of these operations generally involves the use of a dedicated tool head that includes the necessary drives, motors, air valves, and the like for performing the desired operation. Each operation typically requires the use of a different, specialized tool head. Each operation also generally involves the use of a product fixture or nest that holds the article of manufacture in a particular way such that the tool head can access the product as needed to conduct the corresponding operation.

Computer controlled manufacturing and machining centers must be specifically programmed for each operation. For example, movement and operation of the tool head must be programmed based on, among other things, the configuration of the product, the operation being performed, and the tool head and nest that are being used. Complicated manufacturing operations having numerous steps frequently involve the use of a production line having multiple manufacturing and machining centers, with each center specifically programmed to perform a specific step in the manufacturing process, such as drilling, milling, glue applying, heat staking, and the like. If the production line is to be modified to manufacture a different product, the heads, nests, and programming of each machine must be changed, resulting in costly down time.

SUMMARY

In some aspects, a computer controlled manufacturing center includes a base including at least one base mount and a base electrical connector, an arm moveable with respect to the base and including at least one arm mount and an arm electrical connector, and a drive assembly operable to move the arm with respect to the base. First and second nests are interchangeably coupleable to the base. The first and second nests are configured differently from one another for use during different manufacturing operations. Each nest includes at least one nest mount engageable with the base mount to locate the respective nest relative to the base. The first nest including a first nest electrical connector electrically engageable with the base electrical connector and having a first nest electrical configuration. The second nest includes a second nest electrical connector electrically engageable with the base electrical connector and having a second nest electrical configuration different from the first nest electrical configuration. First and second tool heads are interchangeably coupleable to the arm. Each tool head is configured to perform a different manufacturing operation and includes at least one tool mount engageable with the arm mount to couple the respective tool head to the arm for movement therewith. The first tool head includes a first tool electrical connector electrically engageable with the arm electrical connector and having a first tool electrical configuration. The second tool head includes a second tool electrical connector electrically engageable with the arm electrical connector and having a second tool electrical configuration different from the first tool electrical configuration. A controller is in communication with the drive assembly, the base electrical connector, and the arm electrical connector. The controller is operable to: a) determine whether the first nest or the second nest is coupled to the base by determining whether the first nest electrical connector or the second nest electrical connector is electrically engaged with the base electrical connector; b) determine whether the first tool head or the second tool head is coupled to the arm by determining whether the first tool electrical connector or the second tool electrical connector is electrically engaged with the arm electrical connector; and c) based on the determinations of a) and b), select at least one control program for moving the arm and operating the tool head from a plurality of control programs.

In other aspects, a manufacturing robot includes a base including a base electrical connector, and an arm having an end movable with respect to the base and including an arm electrical connector. First and second nests are interchangeably coupleable to the base. The first nest includes a first nest electrical connector engageable with the base electrical connector and having a first nest electrical configuration. The second nest including a second nest electrical connector engageable with the base electrical connector and having a second nest electrical configuration. First and second tools are interchangeably coupleable to the end. The first tool includes a first tool electrical connector engageable with the arm electrical connector and having a first tool electrical configuration. The second tool includes a second tool electrical connector engageable with the arm electrical connector and having a second tool electrical configuration. A controller is operable to control movement of the arm and is in communication with the base electrical connector and the arm electrical connector to determine which nest is coupled to the base and which arm is coupled to the end.

In still other aspects, a manufacturing center is configured for use with a plurality of tools and a plurality of nests. The manufacturing center includes a base that is configured for coupling with one of the plurality of nests. The base includes a base electrical connector. The manufacturing center also includes an arm configured for coupling with one of the plurality of tools. The arm has an end movable with respect to the base, and the end includes an arm electrical connector. The manufacturing center also includes a controller that is operable to control movement of the arm and that is in communication with the base electrical connector and the arm electrical connector. The controller is operable to identify which one of the plurality of tools is coupled with the arm and which one of the plurality of nests is coupled with the base at least in part by way of communication with the arm electrical connector and with the base electrical connector.

BRIEF DESCRIPTION OF THE DRAWINGS

FIG. 5 is a perspective view of a gluing tool head that can be coupled to the Z-axis assembly of FIG. 3 in place of the drilling/milling tool head.

FIG. 6 is a perspective view of a heat staking tool head that can be coupled to the Z-axis assembly of FIG. 3 in place of the drilling/milling tool head.

FIG. 9 illustrates a home screen for a human machine interface of the manufacturing and machining center of FIG. 1.

FIG. 10 illustrates an input status screen for the human machine interface of the manufacturing and machining center of FIG. 1.

FIG. 11 illustrates an output status screen for the human machine interface of the manufacturing and machining center of FIG. 1.

FIG. 12 illustrates an alarm help screen for the human machine interface of the manufacturing and machining center of FIG. 1.

FIG. 14 illustrates a mill program screen for the human machine interface of the manufacturing and machining center of FIG. 1.

In the following detailed description, various details are set forth by way of examples to provide a thorough understanding of certain concepts and teachings. While the invention is capable of being practiced and carried out in a variety of ways, at least one embodiment will be described herein in detail with the understanding that the present disclosure is provided to highlight and exemplify certain principles of the invention and should not be regarded as limiting the scope of the invention only to the embodiment(s) illustrated and described.

DETAILED DESCRIPTION

Figure 1:
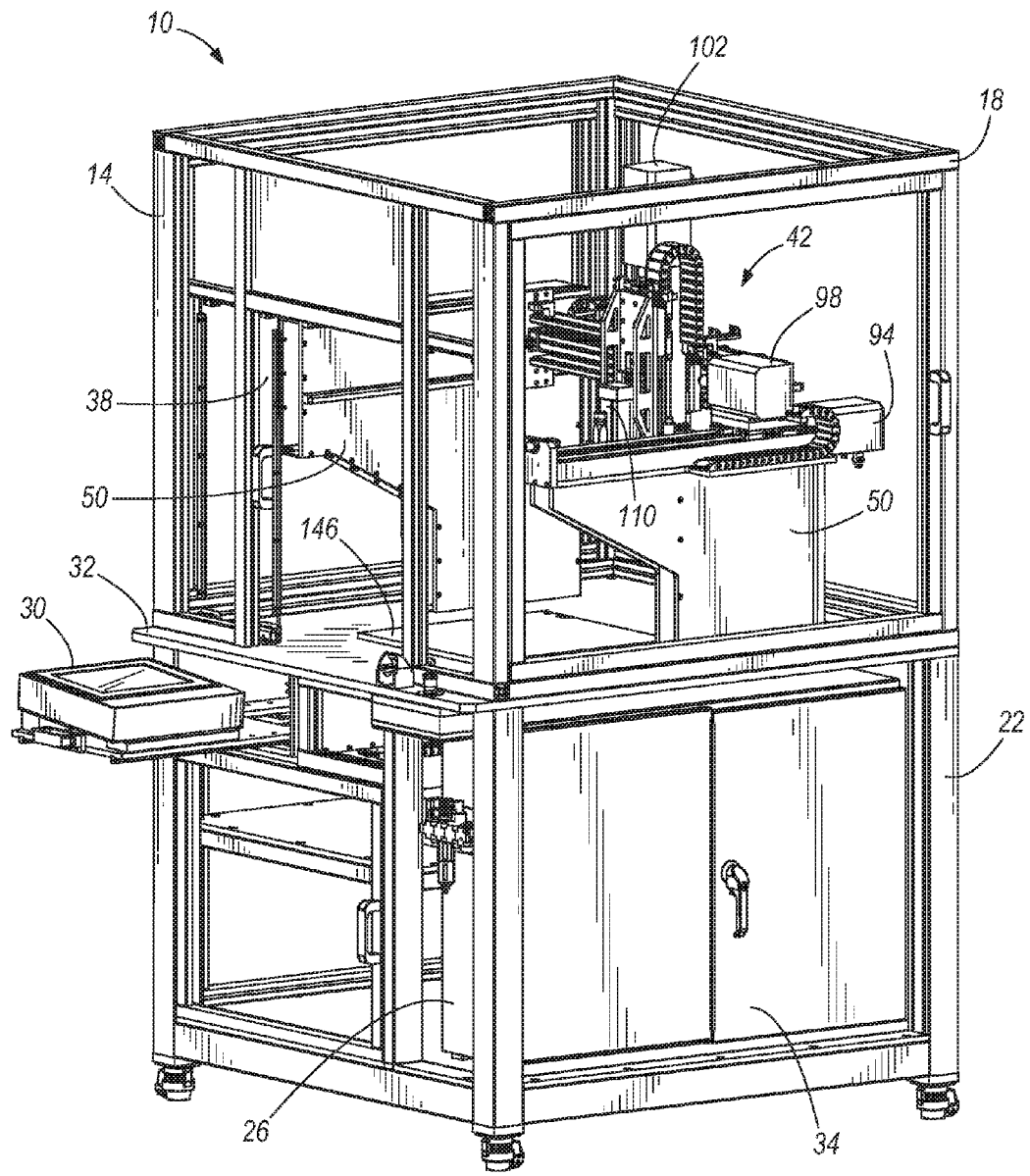
FIG. 1 is a perspective view of a manufacturing and machining center configured for use with interchangeable tool heads and nests.

FIG. 1 illustrates a computer controlled manufacturing center 10, which may also be referred to generally as a manufacturing robot. The illustrated center 10 includes a cabinet 14 that supports the various components of the center 10. The illustrated cabinet 14 includes a first or upper portion 18 where machining and manufacturing operations take place, and a second or lower portion 22 that houses a control system 26 that, in the illustrated construction, includes an integrated interface 30, discussed below. A base plate 32 is supported by the cabinet 14 and generally separates the upper portion 18 from the lower portion 22. The interface 30 can be slidably mounted to the lower portion 22 of the cabinet 14, generally as shown, so that the interface 30 can be stowed during manufacturing operations, for example to avoid inadvertent damage or unwanted control inputs. The cabinet 14 can also be provided with suitable panels and guards in the form of doors 34, windows 38, and the like, as generally known in the art for selectively preventing or permitting access to various components of the center 10. Such moveable doors 34 and windows 38 may be provided with appropriate safety switches or "lockouts" so the center 10 will only operate when the doors 34 and windows 38 are in a closed position.

Figure 2:
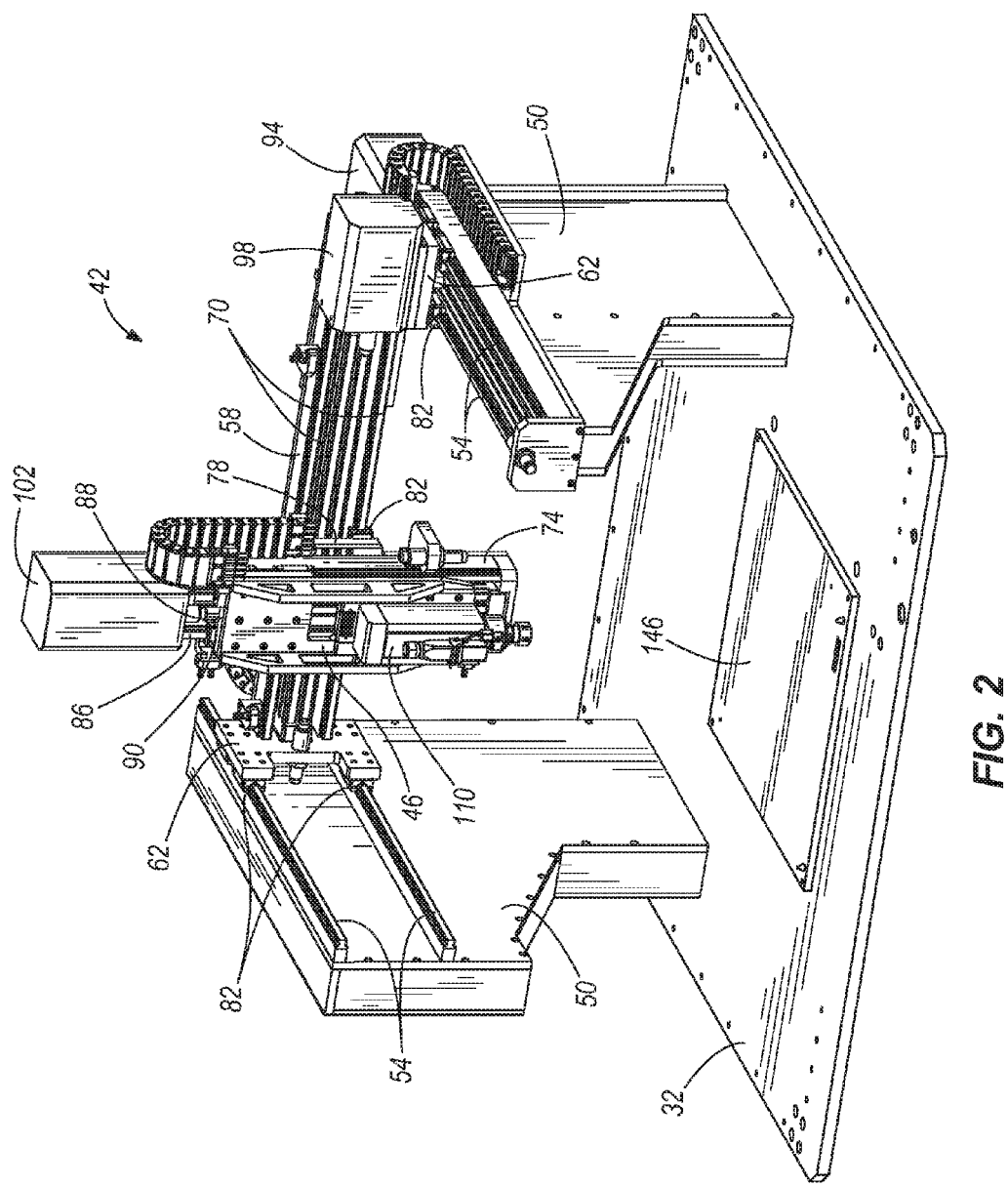
FIG. 2 is a perspective view of a production area of the manufacturing and machining center of FIG. 1.

Referring also to FIG. 2, an exemplary robotic assembly 42 is shown mounted to the base plate 32. The illustrated robotic assembly 42 is a 3-axis robotic assembly 42 configured to move an arm 46 along three mutually perpendicular and substantially linear axes. Other embodiments of the invention may include robotic assemblies 42 having more or fewer degrees of freedom, ranging from a linear or rotary actuator having a single degree of freedom up to and including a "six-axis" robotic assembly 42 capable of moving the arm 46 through all six degrees of freedom.

The illustrated robotic assembly 42 includes first and second spaced apart uprights 50 fixedly coupled to the base plate 32. Each upright 50 includes a guide assembly in the form of Y guide rails 54 that are substantially parallel with one another and with the base plate. The Y guide rails 54 extend in and generally define the "Y-axis" of movement for the arm 46. A cross bar 58 is coupled to and extends between the uprights 50. More specifically, the cross bar 58 is slidably mounted to the Y guide rails 54 for substantially linear movement with respect to the uprights 50 along the Y-axis. To this end, the cross bar 58 includes first and second carriage assemblies 62 each having linear bearing assemblies 66 configured for linear movement along a respective one of the Y guide rails 54.

The cross bar 58 also is provided with a guide assembly in the form of X guide rails 70 that are substantially parallel with one another, parallel to the base plate 32, and perpendicular to the Y guide rails 54 mounted on the uprights 50. The X guide rails 70 extend in and generally define the "X-axis" of movement for the arm 46. A substantially vertically oriented Z carriage 74 is coupled to the cross bar 58. More specifically, the Z carriage 74 is slidably mounted to the X guide rails 70 for substantially linear movement with respect to the cross bar 58 along the X-axis. To this end, the Z carriage 74 includes a carriage assembly 78 having linear bearing assemblies 82 configured for linear movement along respective ones of the X guide rails 70.

Figure 3:
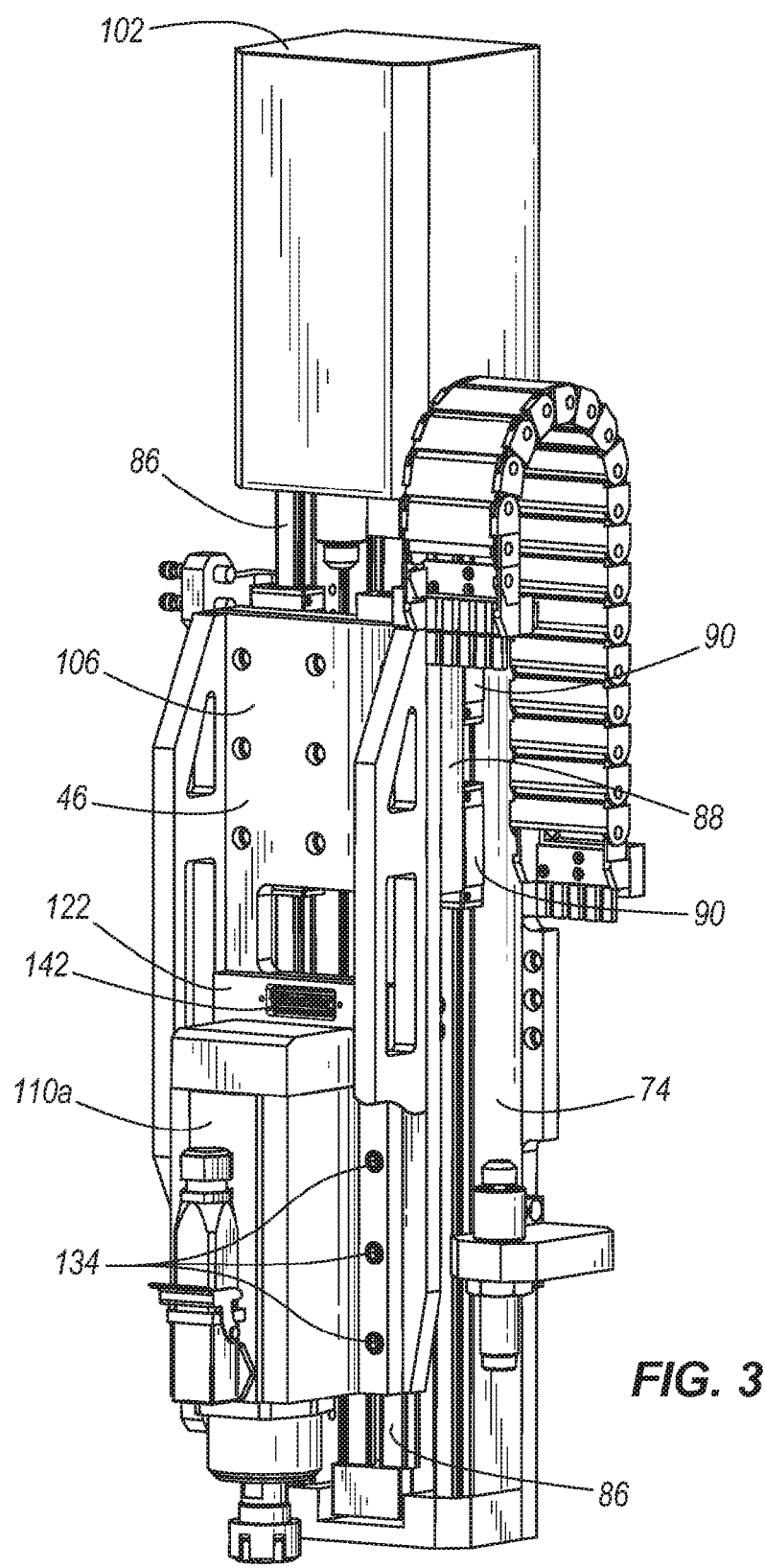
FIG. 3 is a perspective view of a Z-axis assembly with a drilling/milling tool head coupled thereto.

Referring also to FIG. 3, which illustrates the Z carriage 74 and the arm 46, the Z carriage 74 also is provided with a guide assembly in the form of Z guide rails 86 that are substantially parallel with one another, perpendicular to the base plate 32, and perpendicular to the Y guide rails 54 and to the X guide rails 70. The Z guide rails 86 extend in and generally define the "Z-axis" of movement for the arm 46. The arm 46 is slidably mounted to the Z guide rails 86 for substantially linear movement with respect to the Z carriage 74 along the Z-axis. To this end, the arm 46 includes a carriage assembly 88 having linear bearing assemblies 90 configured for linear movement along respective ones of the Z guide rails 86.

As shown in FIG. 1, the robotic assembly 42 also includes a first drive assembly 94 for moving the cross bar 58 along the Y-axis, a second drive assembly 98 for moving the Z carriage 74 along the X-axis, and a third drive assembly 102 for moving the arm 46 along the Z-axis. The first drive assembly 94 is mounted to an upper portion of one of the uprights 50 and is drivingly coupled to the cross bar 58 for moving the cross bar along the Y guide rails 54. The second drive assembly 98 is mounted to one of the carriage assemblies 62 of the cross bar 58 for movement therewith. The second drive assembly 98 is drivingly coupled to the Z carriage 74 for moving the Z carriage 74 along the X guide rails 70. The third drive assembly 102 is mounted to an upper end of the Z carriage 74 for movement therewith. The third drive assembly 102 is drivingly coupled to the arm 46 for moving the arm 46 along the Z guide rails 86. The first, second, and third drive assemblies 94, 98, 102 are each electrically coupled to the control system 26, which controls operation of the drive assemblies 94, 98, 102. The drive assemblies 94, 98, 102 are also each provided with or coupled to sensors that communicate with the control system 26 to provide information regarding the relative positions of the cross bar 58, the Z carriage 74, and the arm 46 to the control system 26. In this way, the control system 26 is provided with "closed loop" control over the relative positions of the cross bar 58, the Z carriage 74, and the arm 46.

Those skilled in the art will recognize that the above described robotic assembly 42 is only one example of a robotic assembly that may be used in combination with the teachings of the present invention, and that other robotic assemblies having different configurations of arms, guide assemblies, drive assemblies, and the like may also be used.

Referring now to FIGS. 2-6, the arm 46 includes an arm mount in the form of a mounting plate 106 to which any one of a plurality of interchangeable tool heads may be coupled. In the configuration shown in FIGS. 2 and 3, a tool head in the form of a drilling/milling tool head 110*a* is shown coupled to the mounting plate 106. A gluing tool head 110*b* is shown in FIG. 5, and a heat staking tool head 110*c* is shown in FIG. 6, both of which may also be coupled to the mounting plate 106. The mounting plate 106 is provided with alignment features in the form of locating pins 114 and a plurality of mounting holes 118, which in the illustrated embodiment are threaded. The tool head 110*a* (as well as the tool heads 110*b* and 110*c*) includes a tool mount in the form of a mounting base 122 having blind locating bores (not shown) positioned to receive the locating pins 114 and countersunk through bores 130 positioned for alignment with the mounting holes 118 in the mounting plate 106 such that fasteners 134 can be extended through the bores 130 and into the mounting holes 118 to couple the mounting base 122 and the tool head 110*a* to the mounting plate 106. The tool heads 110*b*, 110*c* are configured with a similar mounting base 122 and can thus be coupled to the mounting plate 106 in a similar manner. When the tool head 110*a*, 110*b*, 110*c* is coupled to the mounting plate 106, the tool head 110*a*, 110*b*, 110*c* is moveable with the arm 46 to perform manufacturing and machining operations.

Figure 4:
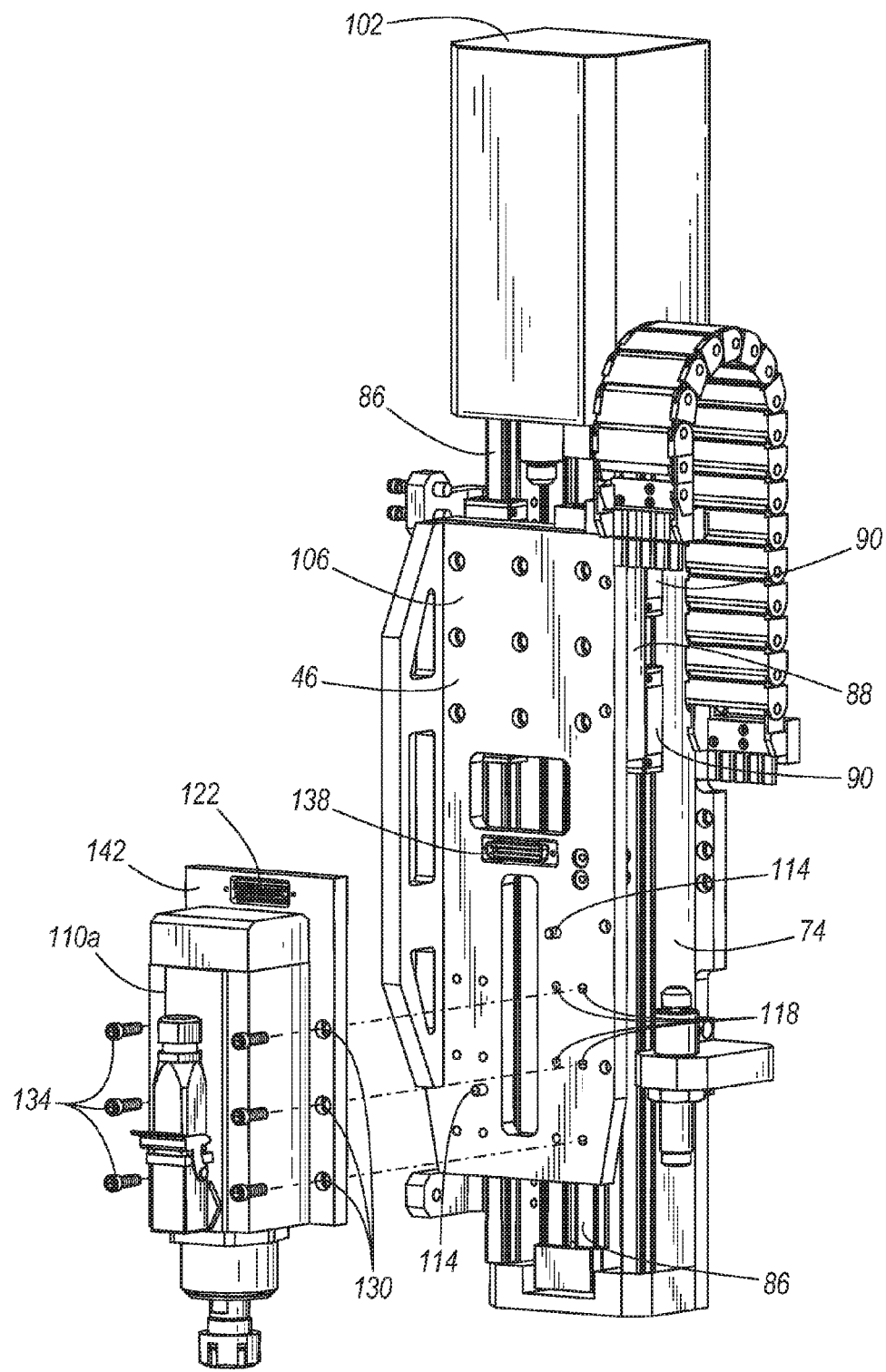
FIG. 4 is an exploded perspective view similar to FIG. 3 showing the drilling/milling tool head separated from the Z-axis assembly.

As best shown in FIG. 4, the arm 46 also includes an arm electrical connector 138 that, in the illustrated configuration, is mounted in a recess provided in the mounting plate 106. The arm electrical connector 138 is electrically coupled to the control system 26 for electronic communication therewith. In the illustrated construction the arm electrical connector 138 is a 25 pin female connector. Those skilled in the art will appreciate that a wide variety of other electrical connectors would also be suitable and fall within the spirit and scope of the present invention. The arm electrical connector 138 is configured for electrical coupling with a tool electrical connector 142 that, in the illustrated configuration, is mounted in a recess provided in the mounting base 122. Although other configurations are possible, in the illustrated configuration, as the mounting base 122 is coupled to the mounting plate 106 using the fasteners 134, the tool electrical connector 142 is aligned for electrical engagement with the arm electrical connector 138 such that when the fasteners 134 are tightened the tool electrical connector 142 and the arm electrical connector 138 are drawn into complete electrical engagement with one another. As shown in FIGS. 5 and 6, the tool heads 110*b* and 110*c* are also provided with tool electrical connectors 142 that, except as noted below, are located and configured similarly to the tool electrical connector 142 of the tool head 110*a* for electrical coupling with the arm electrical connector 138. In this way, the tool heads 110*a*, 110*b*, 110*c* are all coupled to the arm 46 in substantially the same way to reduce assembly or setup errors when changing between the tool heads 110*a*, 110*b*, 110*c*.

Figure 7:
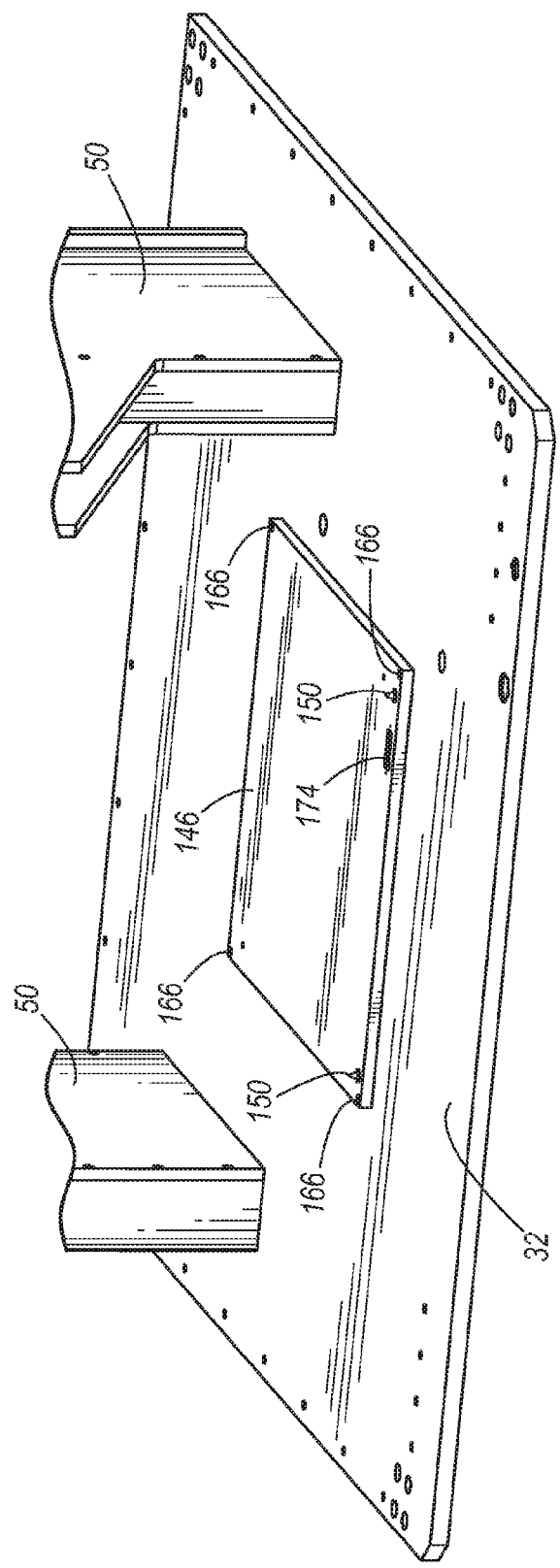
FIG. 7 is a perspective view of a nest blank coupled to a base plate of the manufacturing and machining center of FIG. 1.
Figure 8:
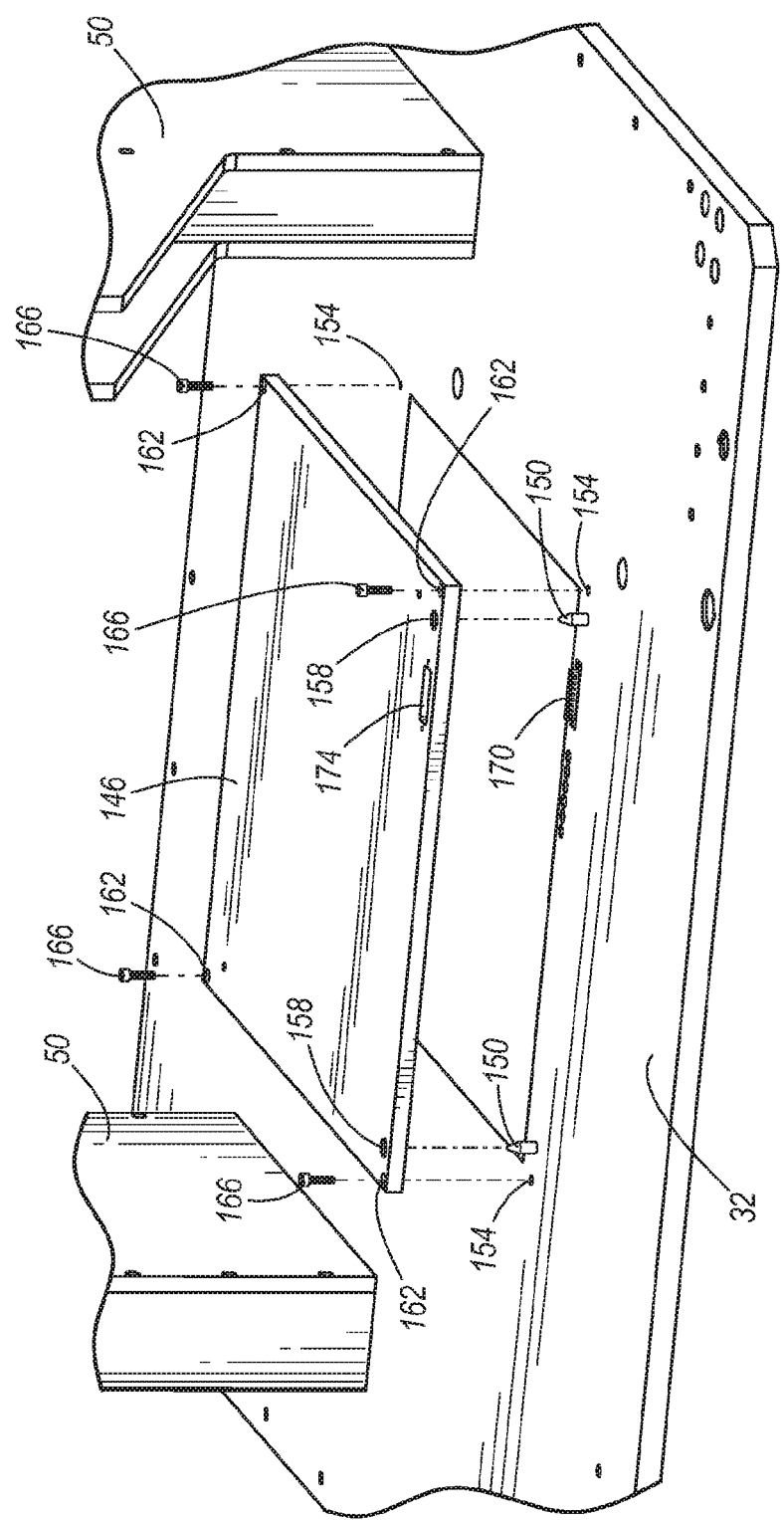
FIG. 8 is an exploded perspective view similar to FIG. 7 showing the nest blank separated from a base plate.

Referring also to FIGS. 7 and 8, the base plate 32 is configured to removably support a nest 146 that holds or otherwise supports a product of manufacture. The illustrated nest 146 is depicted as a flat plate, however it should be appreciated that the nest 146 can be provided with any combination of supporting and fixture features such as openings, cavities, clamps, ribs, grooves, and the like, as appropriate for supporting the particular product of manufacture that is to be worked upon. Accordingly, the illustrated nest 146 is one example of a plurality of interchangeable nests that, like the tool heads 110*a*, 110*b*, 110*c*, are configured differently from one another for supporting different products of manufacture, but are interchangeably coupleable to the base plate 32 in substantially the same manner.

The base plate 32 includes a base mount configuration that, in the illustrated embodiment, includes a combination of pins 150 and threaded bores 154, and each nest 146, including the illustrated nest 146, includes a nest mount configuration adapted for coupling with the base mount configuration. In the illustrated configuration, the nest mount configuration appropriately includes a first set of bores 158 for receiving the pins 150 and a second set of bores 162 for receiving fasteners 166 that can be extended through the nest 146 and threaded into the threaded bores 154 of the base plate 32.

The base plate 32 also includes a base electrical connector 170 electrically coupled to the control system 26 for electronic communication therewith. In the illustrated construction the base electrical connector 170 is a 25 pin female connector, like the arm electrical connector 138. Those skilled in the art will appreciate that a wide variety of other electrical connectors would also be suitable and fall within the spirit and scope of the present invention. The base electrical connector 170 is configured for electrical coupling with a nest electrical connector 174 that, in the illustrated configuration, is mounted in a recess provided in the nest 146. Although other configurations are possible, in the illustrated configuration, as the nest 146 is coupled to the base plate 32 using the fasteners 166, the nest electrical connector 174 is aligned for electrical engagement with the base electrical connector 170 such that when the fasteners 166 are tightened the nest electrical connector 174 and the base electrical connector 170 are drawn into complete electrical engagement with one another. Each interchangeable nest 146 is also provided with nest electrical connectors 174 that, except as noted below, are located and configured similarly to the nest electrical connector 174 of the illustrated nest 146 for electrical coupling with the base electrical connector 170. In this way, the nests 146 are all coupled to the base plate 32 in substantially the same way to reduce assembly or setup errors when changing between the nests.

Each tool electrical connector 142 and each nest electrical connector 174 includes an identification portion having a unique electrical configuration that allows the control system 26 to determine specifically which one of the plurality of tools 110*a*, 110*b*, 110*c*, and which one of the plurality of nests 146 are coupled respectively to the arm 42 and to the base plate 32. In one exemplary embodiment, certain pins of each tool electrical connector 142 and each nest electrical connectors 174 are electrically coupled or "jumpered" to one another in a unique way such that each nest electrical connector 174 and each tool electrical connector 142 has a unique jumper configuration. By electrically coupling different combinations of pins in each tool electrical connector 142 and each nest electrical connector 174, the tool electrical connectors 142 and nest electrical connectors 174 can each be provided with a unique electrical configuration that can be detected by the control system 26. In other embodiments, certain pins or combination of pins may be provided with a certain resistance that can also be detected by the control system 26. These and other techniques for providing a unique electrical configuration all fall within the spirit and scope of the present invention.

In addition to having a unique electrical configuration, each tool electrical connector 142 and each nest electrical connector 174 may also include a control portion that communicates control signals between the control system 26 and the tool 110 or nest 146 for controlling operation of different features of the tool 110 or nest 146. Examples of control signals that might be carried by the tool electrical connector 142 and/or the nest electrical connector 174 include signals for turning a motor or solenoid on or off, and signals from sensors provided on the tool or nest, among others. In the illustrated embodiments the control portion of the tool electrical connector 142 and the nest electrical connector 174 can include, for example, a dedicated set of pins for carrying the control signals.

The control system 26 is generally comprised of a combination of computer hardware and software, and generally includes at least a processor, memory, and an input/output interface. As discussed below, the control system 26 can be provided with a plurality of control programs for controlling movement of the robotic assembly 42 and, when appropriate, operation of the tool 110 and the nest 146. In this regard, control programs will generally include a code portion for controlling operation of the drive assemblies 94, 98, 110, and may optionally include code portions for controlling operation of the tool 110 and the nest 146. Whether and to what extent the program includes a code portion for controlling operation of the tool 110 and the nest 146 will generally depend upon whether tool 110 or the nest 146 includes features that can be controlled. For example, a control program associated with the drilling/milling tool 110*a* will generally include a code section for adjusting the rotational speed of the milling head.

In some embodiments, the plurality of control programs can be stored as an array of control programs having, for example, a first set of control programs associated with a first nest and including a first control program for controlling operation when the first nest is used in combination with the drilling/milling tool 110*a*, and a second control program for controlling operation when the first nest is used in combination with the gluing tool 110*b*. A second set of control programs in the array of control programs may then include individual control programs associated with a second nest and for controlling operation when the second nest is used in combination with, for example, the drilling/milling tool 110*a* and the gluing tool 110*b*.

By communicating with the arm electrical connector 138 and the base electrical connector 170, the control system 26 is able to determine which tool is coupled to the arm 46 and which nest 146 is coupled to the base plate 32. More specifically, because each tool electrical connector 142 and each nest electrical connector 174 has a unique electrical configuration, the control system 26 is able to uniquely identify the installed tool 110 and the installed nest 146. Once the control system 26 has determined which tool and which nest 146 are in use, the control system 26 can select the appropriate control program from the array of control programs for operating the drive assemblies 94, 98, 102 and, if necessary, the tool 110 and the nest 146, for the specific tool 110 and nest 146 that are installed.

Figure 15:
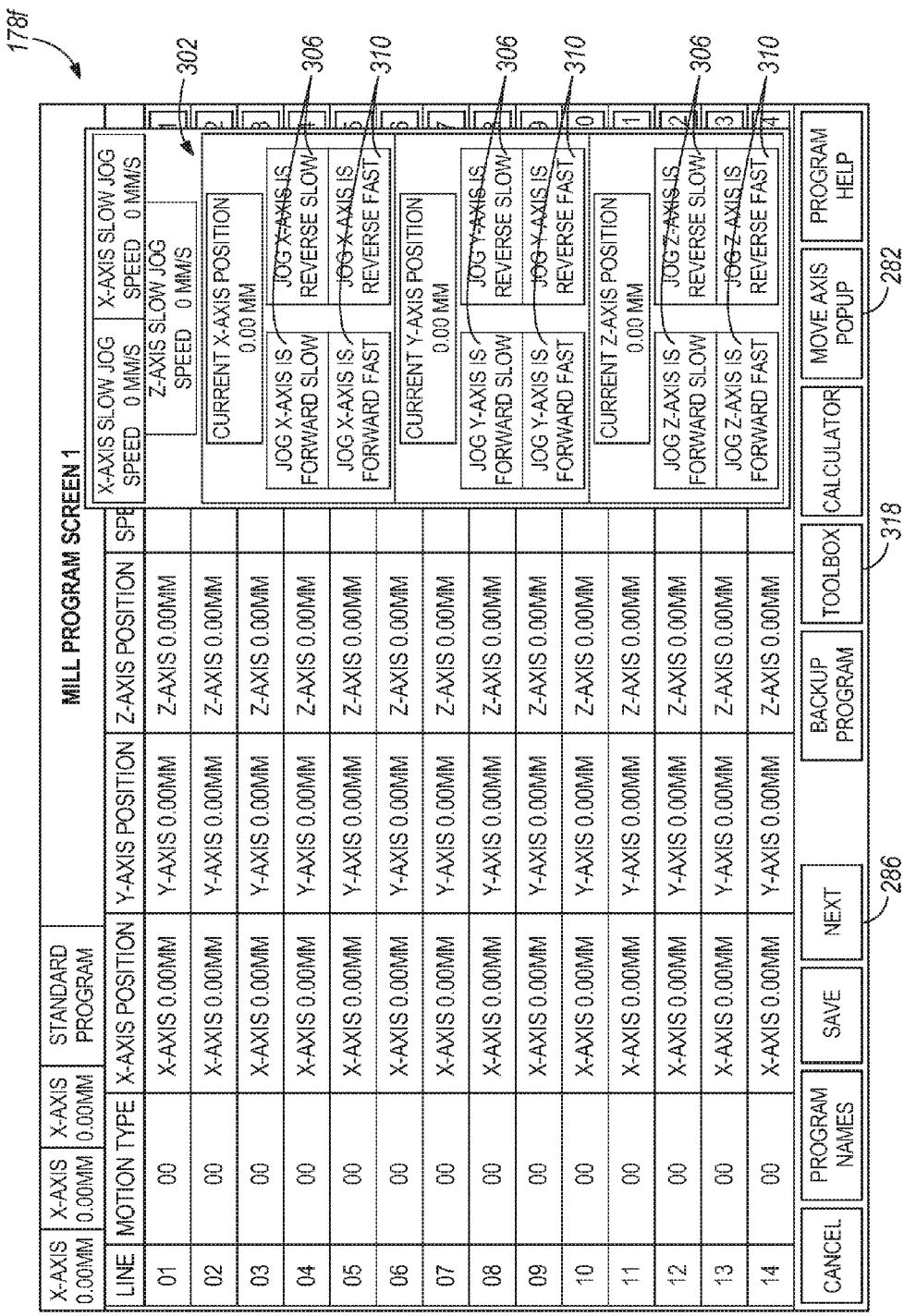
FIG. 15 illustrates the mill program screen of FIG. 14 with a move axis popup activated.
Figure 16:
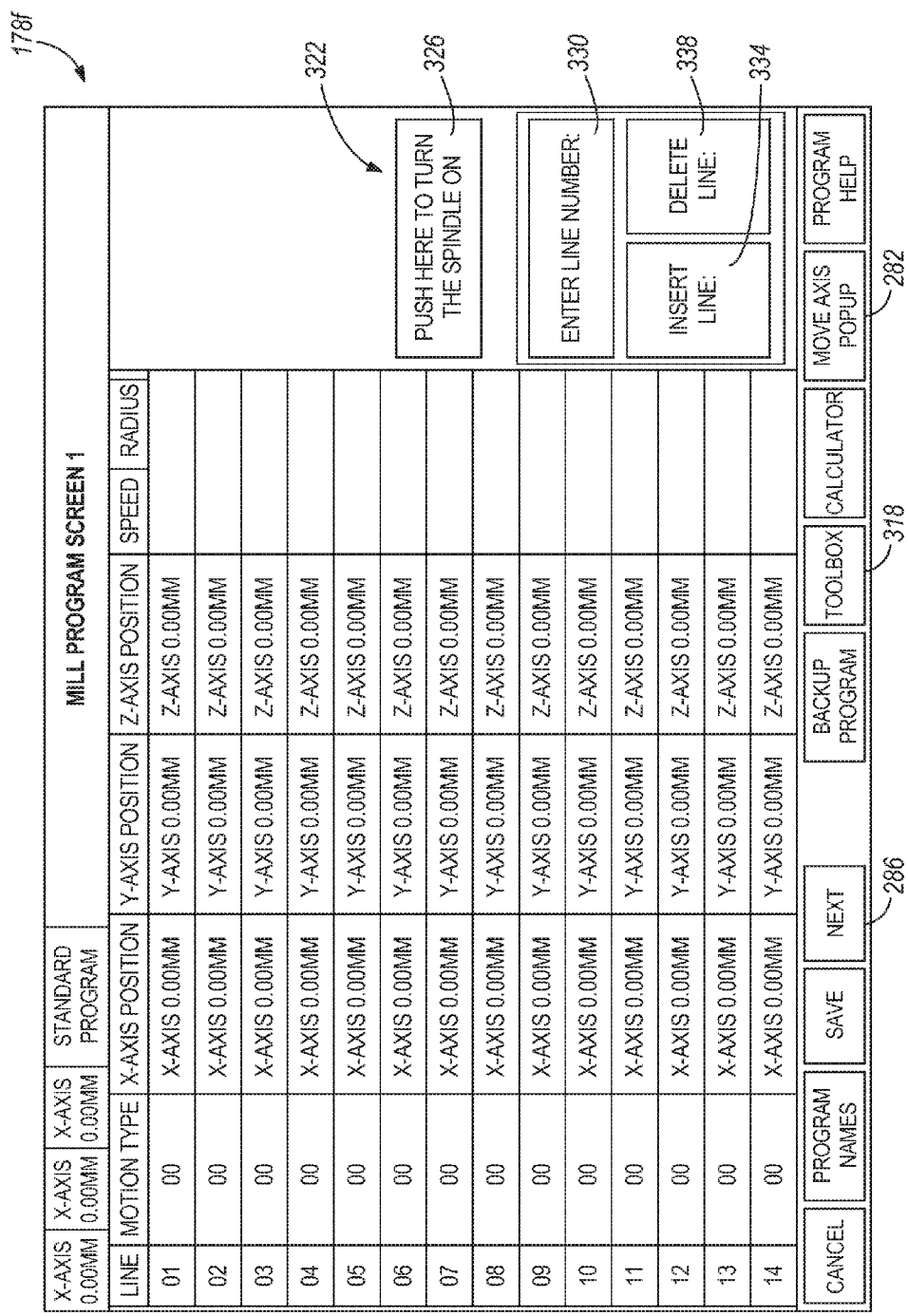
FIG. 16 illustrates the mill program screen of FIG. 14 with a programming toolbox popup activated.

Referring now also to FIGS. 9-16, the interface 30 can be in the form of a computerized touch screen device having a plurality of interface screens 178. By way of example, control system 26 can be programmed to display the following interface screens 178 on the interface 30: a home screen 178*a* (FIG. 9); an input status screen 178*b* (FIG. 10); an output status screen 178*c* (FIG. 11); an alarm help screen 178*d* (FIG. 12); a nest settings screen 178*e* (FIG. 13); and a mill program screen 178*f* (FIGS. 14-16). Collectively, the interface screens 178 allow a user to operate, program, monitor, and troubleshoot the manufacturing center 10. Each interface screen 178 is described in further detail below.

As shown in FIG. 9, the home screen 178*a* is used to navigate through the other interface screens 178 and also to display the current status of the manufacturing center 10. The home screen 178*a* includes a plurality of information boxes, including current position boxes 182 that identify the current position of the tool, a current program box 186 that identifies the current program and program line being executed, a current nest box 190 that identifies the nest 146 that is currently installed in the base plate 32, a current mill count box 194 that identifies the number of completed cycles the center 10 has completed using the current program, cycle time boxes 198 that identify the current and previous cycle times, and an instruction box 202 that indicates the instruction currently being executed, if any. The home screen 178*a* also includes a plurality of operator buttons for navigating to other interface screens 178 and for performing specific functions, including an input screen button 206 for navigating to the input status screen 178*b*, an output screen button 210 for navigating to the output status screen 178*c*, and alarm screen button 214 for navigating to an alarm status screen (not shown), a misc. settings button 218 for navigating to the nest settings screen 178*e*, a help button 222 for navigating to the alarm help screen 178*d*, and a force end mill change button 226 that automatically configures the robotic assembly 42 for changing or replacing the tool 110 or a portion of the tool 110. A mill program button 228 appears between the misc. settings button 218 and the help button 222 when a supervisor key is inserted into the center 10 and allows access to the mill program screens discussed further below. By hiding the mill program button 228 whenever the supervisor key is not inserted into the machine, unauthorized users are prevented from accessing the mill program screens and modifying the various control programs that are stored in the control system 26.

As shown in FIG. 10, the input status screen 178*b* displays the values of a plurality of inputs to the control system 26. The input status screen 178*b* can be used, for example, to troubleshoot problems or to assist in programming the machining center 10. In the illustrated embodiment the inputs have values of either true or false and may be highlighted in green for a value of true and red for a value of false. In other embodiments, the inputs may have other values, including values expressed as a range, and the like. The input status screen 178*b* includes a main screen button 230 for navigating to the home screen 178*a*, and a view outputs button 234 for navigating to the output status screen 178*c*. Among the inputs shown in the input status screen 178*b* is a set of five nest ID inputs 238. The nest ID inputs 238 are received from the nest electrical connector 174 and the status of the nest ID inputs 238 changes when a new nest 146 is installed in the base plate 32. Accordingly, the combination of nest ID inputs 238 allows the control system 26 to identify which nest 146 is installed in the base plate 32.

As shown in FIG. 11, the output status screen 178*c* displays the values of a plurality of outputs from the control system 26. The output status screen 178*c* can be used, for example, to troubleshoot problems or to assist in programming the machining center 10. In the illustrated embodiment the outputs have values of either true or false, and may be highlighted in green for a value of true and red for a value of false. In other embodiments, the outputs may have other values, including values expressed as a range, and the like. The output status screen 178*c* includes a main screen button 230 for navigating to the home screen 178*a*, and a view inputs button 240 for navigating to the input status screen 178*b*.

As shown in FIG. 12, the alarm help screen 178*d* displays various built-in alarm types that might be displayed on an alarm status screen (not shown) accessible via the alarm screen button 214, and an explanation of what causes the alarm and/or what the alarm means. The alarm help screen 178*d* also includes an input/output status column 242 that displays the current status of relevant inputs and outputs for a particular alarm. The alarm help screen 178*d* can be used, for example, to troubleshoot problems and resolve alarms that might be preventing operation of the machining center 10. The illustrated alarm help screen 178*d* is one of a plurality of alarm help screens 178*d* because the number of possible alarms exceeds the amount of information that can reasonably be displayed on an alarm help single screen 178*d*. In this regard the alarm help screen 178*d* is provided with a next button 246 for navigating to the next alarm help screen 178*d* and a previous button 250 for navigating to the previous alarm help screen 178*d*. The alarm help screen 178*d* also includes a main screen button 230 for navigating to the home screen 178*a*, and a maintenance button 254 for navigating to a maintenance screen (not shown).

Figure 13:
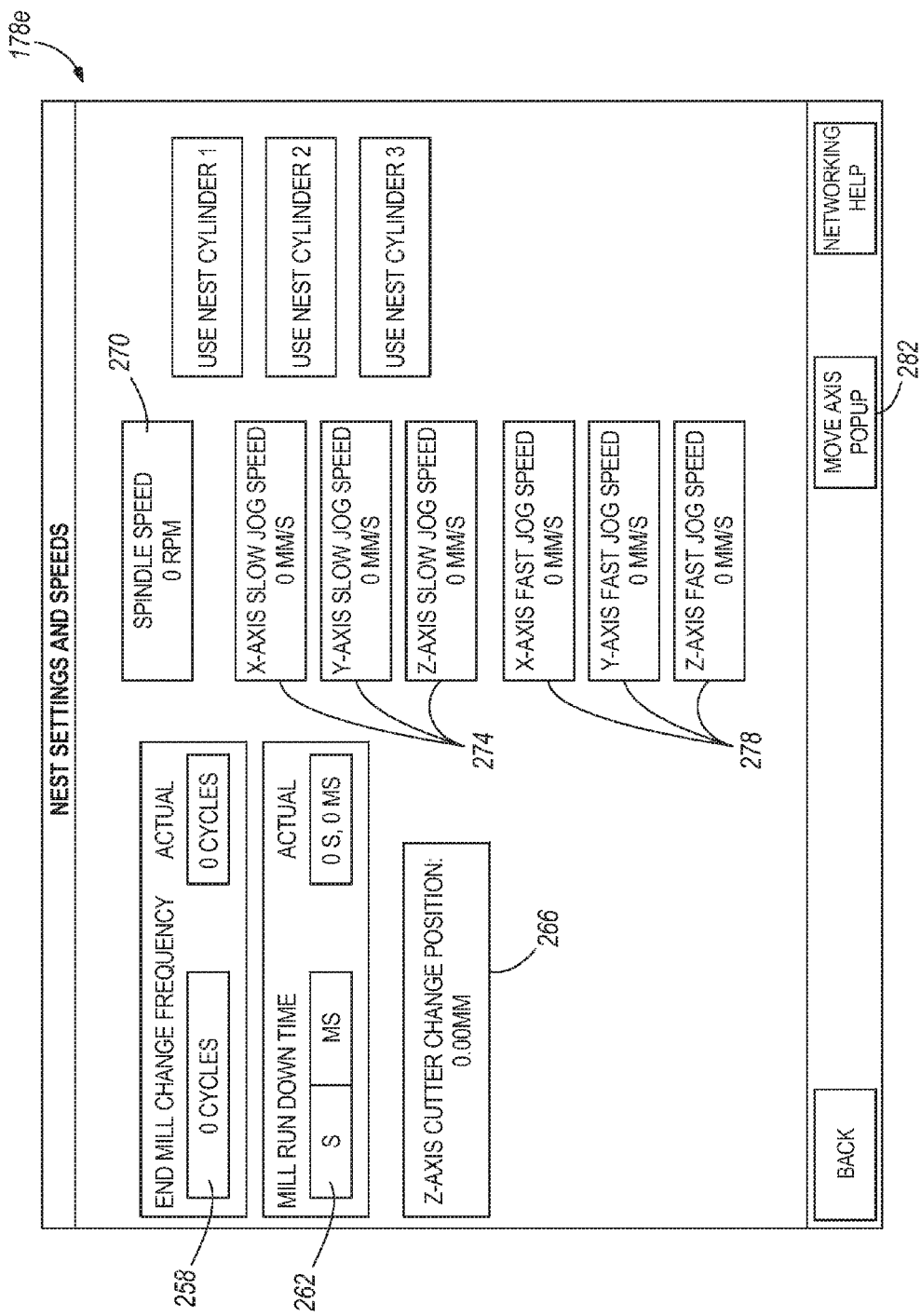
FIG. 13 illustrates a nest settings screen for the human machine interface of the manufacturing and machining center of FIG. 1.

As shown in FIG. 13, the nest settings screen 178*e* includes a plurality of parameter boxes that can be used to set operating parameters for whichever nest 146 is currently installed on the base plate 32. An end mill change frequency parameter 258 can be used to establish a cycle count threshold after which the machine will provide an indication to the operator that the end mill (if any) of the tool 110 needs to be replaced. A mill run down time parameter 262 can be used to establish the time allotted for a rotating tool head to stop spinning, for example before moving the arm 46 or unlocking one of the doors 34 or windows 38 to permit operator access. A Z-axis cutter change position parameter 266 can be used to set the position along the Z-axis that is assumed by the arm 46 during an end mill replacement. A spindle speed parameter 270 can be used to adjust the spindle speed of the tool 110. A set of slow jog speed parameters 274 (one for each axis) can be used to adjust a slow jog speed for movement of the arm 46 during repositioning of the arm 46 between manufacturing operations, and a set of high jog speed parameters 278 (one for each axis) can be used to adjust a high jog speed for movement of the arm 46 during repositioning of the arm 46 between manufacturing operations. To adjust each of the foregoing parameters, a user touches inside the appropriate parameter box and a numeric key pad (not shown) appears on the screen. The user enters the desired parameter value and then presses an enter or OK button on the key pad. The key pad disappears and the desired parameter value is set and displayed within the parameter box. The nest settings screen 178*e* also includes a move axis popup button 282 that brings up a move axis popup (discussed below with respect to the mill program screen 1780 that allows a user to manually move the arm 46 along each of the three axis to assist in setting up or programming the machining center 10.

As shown in FIG. 14, the mill program screen 178*f* is provided to allow a user to prepare a multi-step program for moving the arm 46 and operating the tool 110. The mill program screen 178*f* is accessed by pressing the mill program button 228, which requires a supervisor key to be inserted into the manufacturing center 10, and allows a user to create a milling program line by line. The controller 26 is also configured to accept a milling program in the form of a text file that may be written in G code or another suitable programming language. The illustrated mill program screen 178*f* accommodates fourteen programming lines 288. Additional mill program screens 178*f* for providing additional programming lines 288 can be accessed by pushing the next button 286. The mill program screen 178f includes a line column 290 that displays the line number of the chosen program line. During operation, each programming line 288 is executed in numerical order.

The mill program screen 178*f* also includes a motion type column 294. Some embodiments include three different motion settings that change the way the drive assemblies 94, 98, 110 coordinate their respective movements. The motion settings can be changed by touching inside the appropriate box within the motion type column 294, which brings up a key pad that allows the user to input a motion value (0, 1, or 2) that corresponds to one of the three motion settings. The mill program screen 178*f* also includes three axis position columns 298, one for each axis. Values entered into the axis position columns 298 define the finishing position of the arm 46 after the corresponding program line 288 has been executed. A user can change the values in the axis position columns 298 by touching inside the appropriate box to bring up the key pad that allows the desired numeric value to be entered.

Referring also to FIG. 15, another way to modify the program is to press the move axis popup button 282 (FIGS. 13 and 14) to bring up the move axis popup menu 302. The move axis popup menu allows the operator to manually move the arm 46 about all three axes. For example, with the product of manufacture secured to the nest 146, the user can use the move axis popup menu 302 to move the arm 46 until the arm is located in a desired position for a particular program line 288. In this regard, the move axis popup menu 302 includes slow jog buttons 306 and fast jog buttons 310 for moving the arm 46 along the X, Y, and Z axes in both positive and negative directions. Once the user has moved the arm 46 to the desired finishing location of a particular programming line 288, the user can press the move axis popup button 282 to make the move axis popup menu 302 disappear and then press the teach button 314 (FIG. 14) for that particular programming line 288. Pressing the teach button 314 for a programming line 288 inserts the appropriate X, Y, and Z axis coordinates into the programming line 288 based on the current location of the arm 46. Overall, programming can be accomplished using a combination of the move axis popup menu 302 and by individually entering X, Y, and Z axis values into the programming line 288, as discussed above.

Pressing a toolbox button 318 on the mill program screen 178f brings up a toolbox popup 322 that can further assist a user in editing a program. As shown in FIG. 16, the toolbox popup includes a spindle button 326 for turning the tool spindle on and off, a line number entry button 330 that allows a user to enter a line number and then jump to that line number in the program, and line insertion 334 and line deletion 338 buttons that allow the user to insert or delete lines of programming.

What is claimed is:

1. A computer controlled manufacturing center comprising:
   a base including at least one base mount and a base electrical connector;
   an arm moveable with respect to the base, the arm including at least one arm mount and an arm electrical connector;
   first and second nests interchangeably coupleable to the base, the first and second nests configured differently from one another, each nest including at least one nest mount engageable with the base mount, the first nest including a first nest electrical connector electrically engageable with the base electrical connector, and the second nest including a second nest electrical connector electrically engageable with the base electrical connector;
   first and second tool heads interchangeably coupleable to the arm and including at least one tool mount engageable with the arm mount to couple the respective tool head to the arm for movement therewith, the first tool head including a first tool electrical connector electrically engageable with the arm electrical connector, and the second tool head including a second tool electrical connector electrically engageable with the arm electrical connector; and
   a controller in communication with the base electrical connector and the arm electrical connector, the controller operable to:
   a) determine whether the first nest or the second nest is coupled to the base by determining whether the first nest electrical connector or the second nest electrical connector is electrically engaged with the base electrical connector,
   b) determine whether the first tool head or the second tool head is coupled to the arm by determining whether the first tool electrical connector or the second tool electrical connector is electrically engaged with the arm electrical connector, and
   c) based on the determinations of a) and b), select at least one control program for moving the arm and operating the first tool head or the second tool head from a plurality of control programs.

2. The manufacturing center of claim 1, wherein the arm is movable along three mutually perpendicular axes.

3. The manufacturing center of claim 1, wherein each of the nest electrical connectors and the tool electrical connectors includes a control portion for receiving control signals from the controller.

4. The manufacturing center of claim 1, wherein each of the nest electrical connectors and the tool electrical connectors includes an identification portion for providing identification signals to the controller that identify the specific nest or tool with which the nest electrical connector or tool electrical connector is associated.

5. The manufacturing center of claim 1, wherein the plurality of control programs includes an array of control programs comprising:
   a first set of control programs associated with the first nest and including a first nest first tool control program for the first nest in combination with the first tool head and a first nest second tool control program for the first nest in combination with the second tool head; and
   a second set of control programs associated with the second nest and including a second nest first tool control program for the second nest in combination with the first tool head and a second nest second tool control program for the second nest in combination with the second tool head.

6. The manufacturing center of claim 1, wherein the at least one control program includes instructions for operating at least one of the first nest and the second nest.

7. The manufacturing center of claim 1, further comprising an integrated programming interface for operating the manufacturing center and for programming the plurality of control programs.

8. A manufacturing robot comprising:
   a base including a base electrical connector;
   an arm having an end movable with respect to the base, the end including an arm electrical connector;
   first and second nests interchangeably coupleable to the base, the first nest including a first nest electrical connector engageable with the base electrical connector and the second nest including a second nest electrical connector engageable with the base electrical connector;
   first and second tools interchangeably coupleable to the end, the first tool including a first tool electrical connector engageable with the arm electrical connector and the second tool including a second tool electrical connector engageable with the arm electrical connector; and
   a controller operable to control movement of the arm and in communication with the base electrical connector and the arm electrical connector to determine which nest is coupled to the base and which tool is coupled to the end.

9. The robot of claim 8, wherein the controller is further operable to select at least one control program for moving the arm and operating whichever tool is attached to the arm from a plurality of control programs based at least in part upon which nest is coupled to the base and which tool is coupled to the end.

10. The robot of claim 9, wherein the controller is operable to control operation of the first nest and the second nest, and wherein the at least one control program includes instructions for operating at least one of the first nest and the second nest.

11. The robot of claim 8, wherein the first nest electrical connector includes a first nest electrical configuration and wherein the second nest electrical connector includes a second nest electrical configuration different from the first nest electrical configuration.

12. The robot of claim 8, wherein the first tool electrical connector includes a first tool electrical configuration and wherein the second tool electrical connector includes a second tool electrical configuration different from the first tool electrical configuration.

13. The robot of claim 8, wherein each of the nest electrical connectors and the tool electrical connectors includes a control portion for receiving control signals from the controller.

14. The robot of claim 13, wherein each of the nest electrical connectors and the tool electrical connectors includes an identification portion for providing identification signals to the controller that identify the specific nest or tool with which the nest electrical connector or tool electrical connector is associated.

15. The robot of claim 8, further comprising an integrated programming interface for operating the manufacturing center and for programming the plurality of control programs.

16. A manufacturing center configured for use with a plurality of tools and a plurality of nests, the manufacturing center comprising:
a first portion configured for coupling with one of the plurality of nests, the first portion including a first portion electrical connector;
a second portion configured for coupling with one of the plurality of tools, the second portion being movable with respect to the first portion and including a second portion electrical connector; and
a controller operable to control relative movement between the first portion and the second portion, the controller in communication with the first portion electrical connector and the second portion electrical connector, the controller operable to identify which one of the plurality of tools is coupled with the second portion and which one of the plurality of nests is coupled with the first portion at least in part by way of communication with the second portion electrical connector and with the first portion electrical connector.

17. The manufacturing center of claim 16, wherein the controller is further operable to select at least one control program for moving the first and second portions relative to one another from a plurality of control programs based at least in part upon which nest is coupled to the first portion and which tool is coupled to the second portion.

18. The manufacturing center of claim 16, wherein the first portion electrical connector is configured for electrical connection with a nest electrical connector located on each of the plurality of nests.

19. The manufacturing center of claim 16, wherein the second portion electrical connector is configured for electrical connection with a tool electrical connector located on each of the plurality of tools.

20. The manufacturing center of claim 16, further comprising an integrated programming interface for operating the manufacturing center and for programming the plurality of control programs.

* * * * *